May 5, 1970

M. E. RABEDEAU 3,510,658

LIGHT BEAM SERVOING SYSTEM WITH MEMORY ELEMENT HAVING WAVELENGTH-DISCRIMINATING GUIDE AND DATA TRACKS

Filed Nov. 6, 1967

INVENTOR.
MELBOURNE E. RABEDEAU

BY Gerald L Moore

ATTORNEY

United States Patent Office 3,510,658

Patented May 5, 1970

3,510,658

LIGHT BEAM SERVOING SYSTEM WITH MEMORY ELEMENT HAVING WAVELENGTH-DISCRIMINATING GUIDE AND DATA TRACKS

Melbourne E. Rabedeau, Saratoga, Calif., assignor to International Business Machines Corporation, Armonk, N.Y., a corporation of New York Filed Nov. 6, 1967, Ser. No. 680,806

Int. Cl. G01j *1/36, 1/20*

U.S. Cl. 250—202 11 Claims

ABSTRACT OF THE DISCLOSURE

A servo tracking system for guiding a light beam across a memory element for reading information thereon, wherein the element includes a target comprising predefined tracks which absorb a portion of the beam, which portion can be detected to signal a beam tracking system for maintaining the beam in track alignment.

BACKGROUND OF THE INVENTION

Field of the invention

This invention relates in general to light beam systems for reading and recording information on a target and, more specifically, to a servo system for maintaining the beam in alignment with preselected data tracks on the target.

Description of the prior art

In data recording systems where a light beam is used to record or read information stored on a target or memory element, the problem exists of maintaining the beam in alignment with the data track. To provide a high density data storage system, it is necessary that close control be exercised over the beam while scanning across the target during both recording and readout so that the lines can be placed close together. Otherwise, a slight deviation of the beam from the data track will cause it to encounter and lock into an adjacent track and give an erroneous reading of the data. Naturally, the guiding system for the beam must be quick enough in realigning the beam to bring the beam back onto the data track being read. Therefore, in a sense, the beam servoing capabilities actually determine to a large extent the density at which the data can be recorded.

In some photographic data recording systems, a double frequency system of data representation is used in which the order of occurrence of an opaque and a transparent mark denotes a zero or a one bit. In these systems, the marks are bordered on one side by a transparent band and on the other side by an opaque band, the opaque band being written simultaneously with the opaque marks at the time of data recording. Since, after the record is developed, the time average light transmittance of the scanning spot is the same when scanning a zero bit and a one bit, servoing can be accomplished by comparing the scanner output signal averaged over several bit times with a reference voltage and by feeding the difference between these two signals to a spot positioner to complete the loop.

In some types of data recording systems, notably those employing mark sizes, only slightly larger than the size of the writing beam spot, or systems in which the information is recorded on optical materials in terms of small Faraday effect rotations or circular dichroism, etc., the system described above cannot be used.

Thus, the object of this invention is to provide an accurate servo control for guiding a light beam across a target.

A further object of this invention is to provide a servo system which can be used with either a recording or readout light beam to maintain the beam in close alignment with a predetermined data track.

SUMMARY OF THE INVENTION

A servo tracking system for guiding a light beam across a target comprising a light source for directing a light beam on the target having formed thereon predefined data tracks cimprised of a material absorbant of a portion of the light beam, and means for separating out that beam portion from the data transmitting beam to provide a signal input to the scanning system for guiding the beam.

Other and further objects and features of the invention will be apparent in the following more particular description of a preferred embodiment of the invention.

DESCRIPTION OF A PREFERRED EMBODIMENT

Figure 1:
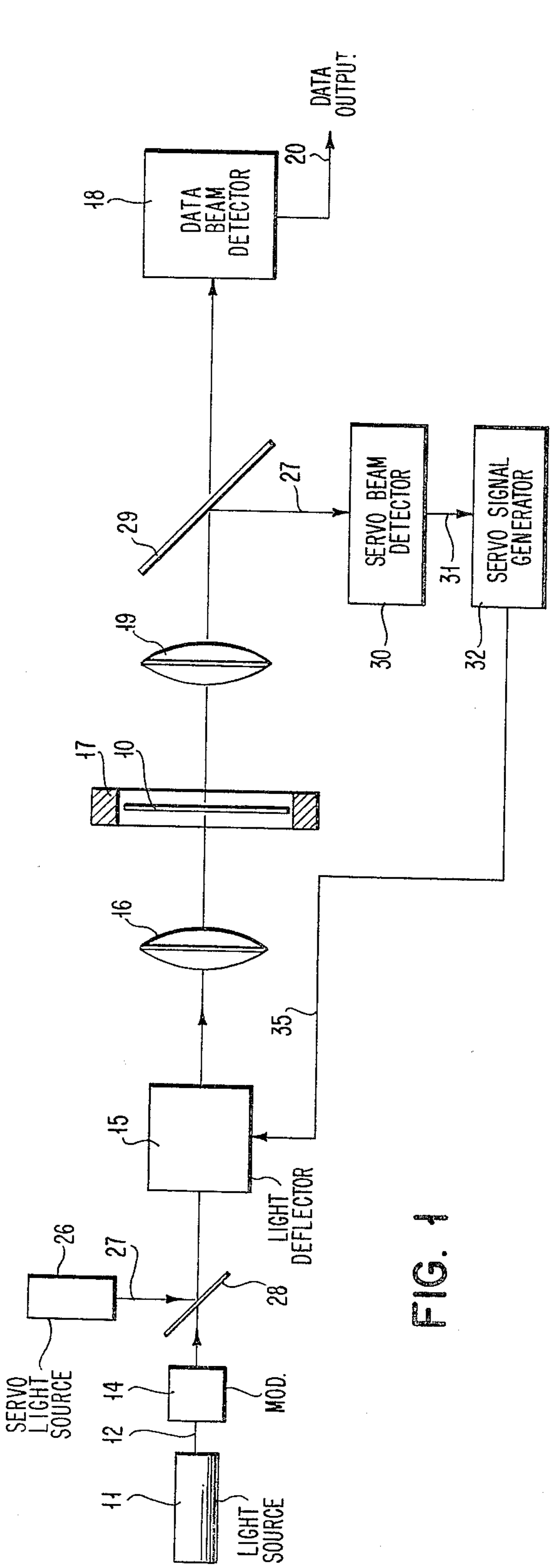
FIG. 1 is a schematic drawing of a data storage system incorporating the subject invention.

In FIG. 1 is shown a data storage system for recording information on and reading information from a memory element 10. This memory element is reactive to light generated at the light source 11. For recording, means is provided to direct the light beam 12 through a modulator 14, a light deflector 15, and an objective lens 16, to be focused onto the memory element. The memory element is made of a magneto-optical material such as a gadolinium iron garnet on which data is recorded by a magnetic alignment of discrete areas of the material. The beam is directed on selected portions of the element to permit the switching of the magnetic alignment of that portion to indicate data.

For instance, to record on the memory element 10 a magnetic coil 17 is energized to provide a magnetic field extending through the memory element in the direction normal to the flat surface thereof. This field is of insufficient strength to affect the magnetic alignment of the element at normal operating temperatures. When the beam 12 is directed onto a discrete area thereof, that area becomes heated which lowers the coercive force of the material and permits a switching of the material to a magnetic alignment corresponding to that of the magnetic field. Thus, by scanning the light beam across the memory element by means of the light deflector 15 and by modulating the beam in response to a data input signal, discrete areas of the memory element can be aligned magnetically to correspond to the data desired to be recorded. An example of a light deflector suitable for such a recording system is described in the U.S. Pat. 3,305,292 entitled Light Deflecting Device by A. Miller and issued on Feb. 21, 1967. Of course, light modulators suitable for this system are well known in this technology.

For reading the information, the same light source 11 is used to generate the light beam 12 which is an unmodulated and decreased intensity state is scanned across the memory element. In the example shown, the light beam is passed through the memory element and intercepted by the condenser 19 and beam detector 18. The beam detector can be any suitable device such as a photoelectric transducer which senses any change in the intensity of the light or a photoelectric transducer plus a polarized beam analyzer for sensing the polarization alignment change of the beam effected by the material responsive to the magnetic alignment of the discrete area through which the beam is passing. Thus, an output signal is provided in the data output line 20 which is indicative of the data recorded on the element.

Naturally, the density at which data can be recorded depends to a large extent upon the size of the discrete areas which can be switched without affecting the next adjacent discrete area. However, another major factor in determining this density is the preciseness with which the beam can be guided along a data line for both recording and readout. Naturally, if the beam can be scanned only with considerable deviation from the data line, the data lines must be separated to prevent the beam from skipping from line to line. It is the purpose of this invention to provide a servo system for closely controlling the scanning path of the light beam as it traverses the memory element.

In accordance with the present invention, a servo tracking system is provided wherein predefined tracks are formed on the memory element which coact with the beam in being highly absorbant of one spectral portion of the beam while the material for retaining the data is absorbant of another spectral portion of the beam in cooperation with means for detecting the separate portions of the beam to provide a servo signal and a data signal. The servo signal is fed through a feedback circuit to control the light deflector for maintaining the beam in alignment with the predefined tracks in both writing and reading data.

Figure 2:
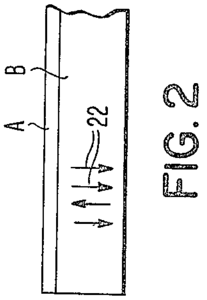
FIG. 2 is a cross-sectional view of a memory element to be used with the invention.
Figure 3:
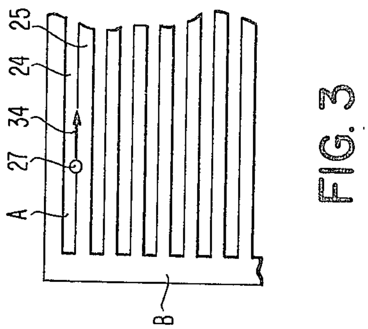
FIG. 3 is a plan view of a portion of the memory element shown in FIG. 2.
Figure 4:
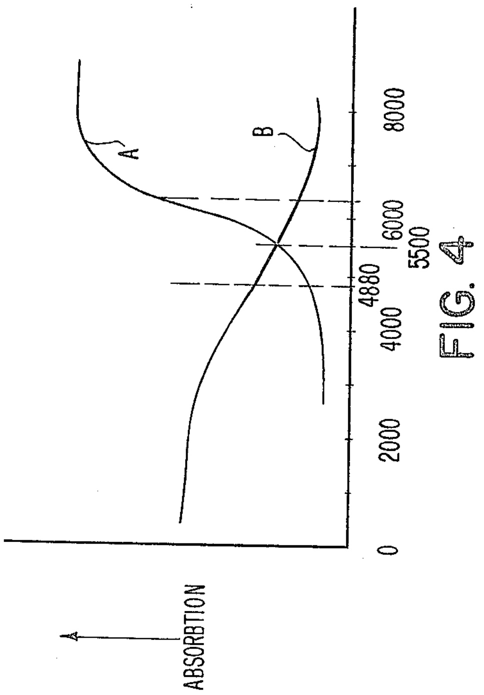
FIG. 4 is a graph of absorption versus wavelength for the A and B materials.

Accordingly, the memory element is comprised of the normal material B, FIGS. 2 and 3, which can be magnetically aligned as indicated by the arrows 22 for the recording of data, as previously explained. An additional partial layer A of material is utilized to form predefined lines 24 (FIG. 3). As shown in FIG. 4, the materials A and B have complementary absorption characteristics wherein in the higher wavelength regions the material A is more absorbant than the lower region in which the material B is more absorbant. Thus, by using a means for supplying a beam having wavelength portions thereof in both regions and by detecting these wavelengths separately, a data and servo signal can be derived within the same system.

In the example shown in FIG. 1, the data source is an argon laser having a wavelength of approximately 4880 A. The material B is highly absorbant of this wavelength, as indicated in the graph of FIG. 4. However, the absorption rate of the material A for light of this wavelength is low. Thus, recording and readout is achieved as heretofore described. In addition, there is provided a servo light source 26 which, for example, can be a helium neon laser source having a wavelength of 6328 A. This servo source is fed into the dichroic mirror 27 which reflects the light along the same axis as the original beam 12. The dichroic mirror 27 functions to pass the beam 12 with very little absorption and little reflection from the original path. Thus, both sources provide portions of the beam which pass through the memory element 10 and the condenser lens 19. Thereafter a dichroic mirror 29 is utilized to separate the beam 27 from the beam 12 and reflect it into a servo beam detector 30. The original beam 12 passes onto the data beam detector 18, as described before. A servo beam detector 30 receives the beam 27 and generates a signal responsive to the intensity of the beam to provide a signal through the conductor 31 to a servo signal generator 32. This signal generator generates an electric energizing signal having a value corresponding to whether the servo beam detector is sensing a beam having an intensity higher or lower than a predetermined value.

Actually, it is desirable to have the beam scan along a path such as that indicated by the arrow 34 (FIG. 3) such that approximately half the spot of servo beam light is focused on the predefined band of material A 24 and half of the spot is focused on the intervening space 25. Thus, if the beam deviates to the left, the intensity characteristic of the beam 27 will diminish due to the higher absorption of the material A to the higher wavelength light. Conversely, the intensity of the servo beam will increase if it deviates to the right during scanning because less of the servo beam light is intercepted by the absorbing material A. By generating an electric signal in the servo signal generator having a value responsive to the higher or lower intensity of the beam 27, the light deflector 15 can be controlled to shift the beam in the proper direction for scanning along the path of the arrow 34.

Other configurations of the material A also can be used, such as making the edges of the material A follow a wavy line to feed into the detector 30 a modulated signal which can be used for timing purposes. By having the adjacent edges of two adjacent lines 24 being capable of modulating the beam in this manner at different frequencies, a signal having a frequency indicative of the path of the beam can be generated. Additionally, the material A can be selected to change other characteristics of the servo beam which can be detected for regulating the scanning of the beam. For instance, the material A can be selected to change the plane of polarization of the beam with the detector 30 selected to sense this characteristic change in the beam to indicate the direction of scan path change necessary to bring the beam in alignment with the data track. The material A also can be deposited directly on the material B with the material B serving as a substrate or, in the alternative, the track 24 can be photocomposed or formed by other processes on or adjacent to the memory element to intercept the beam as it scans the element. Thus, it can be seen that a servo signal which has no effect on the data channel of the data recording system is generated for precisely controlling the scan position of the beam as it traverses the memory element.

While the invention has been particularly shown and described with reference to a preferred embodiment thereof, it will be evident to those skilled in the art that various changes in form and details may be made without departing from the spirit and scope of the invention.

I claim as my invention:

1. A data reading system for reading data stored in a memory element, comprising:

light means for generating a light beam comprising a first light source for generating a first wavelength range and a second light source for generating a second wavelength range, said first and second wavelength ranges different from each other, said first and second wavelength ranges comprising said light beam, said light means positioned to input said beam to a scanning means, for scanning said beam on data tracks on said memory element;

said beam first wavelength range being selected to interact with said data tracks for the reading of data relative to said data tracks while said beam second wavelength range remains relatively unaffected by said data tracks;

said memory element comprising a series of said data tracks and a series of beam guide tracks, each beam guide track of said series of beam guide tracks located relative to each one of said data tracks to intercept at least a portion of said beam when said beam is scanning a predetermined path on a given one of said data tracks, said series of beam guide tracks comprising a material relatively absorptive of said beam second wavelength range and relatively transmissive of said beam first wavelength range, and said series of data tracks comprising a material relatively absorptive of said beam first wavelength range and relatively transmissive of said beam second wavelength range, thereby to change a characteristic of said second wavelength range of said beam when it deviates from said predetermined path on said data track, while said beam first wavelength range remains relatively unaffected by said beam guide tracks;

detecting means for detecting said second wavelength range of said beam after said beam has scanned said memory element, said detecting means generating a signal responsive to the extent of said characteristic of said second wavelength range, said signal input to a generating means;

said generating means responsive to said signal from said detecting means, to generate a control signal representative of the extent of change of characteristics of said second wavelength range from a predetermined value, said control signal thus being representative of the extent of deviation of said beam from said predetermined path on said data track, said control signal being input to said scanning means;

said scanning means responsive to said control signal from said generator means, to adjust the position of said beam on said memory element; and data detecting means for detecting said beam first wavelength range for sensing the change effected thereon by the interaction with said data tracks thereby to generate a signal indicative of data stored on said data tracks.

2. The data reading system of claim 1 wherein said series of beam guide tracks serves to absorb said beam second wavelength range, said second wavelength range being substantially unabsorbed by the material forming said data tracks, said detecting means functions to detect the intensity characteristic of said beam second wavelength range, and said generating means generates a control signal representative of the change in intensity characteristic of said beam second wavelength range from a predetermined value.

3. The data reading system of claim 1 wherein said light beam is comprised of two separate wavelength ranges with one range being absorbed more by said target tracks and the other range being absorbed more by the material forming said data tracks.

4. The data reading system of claim 1 wherein said first light source is located to pass said first wavelength range through a first dichroic mirror, and said second light source is located to reflect said second wavelength range from said dichroic mirror along the same path as said first wavelength range, said first and second wavelength ranges comprising said light beam.

5. The data reading system of claim 4 wherein a second dichroic mirror is located to intercept said light beam after said beam has scanned said memory element, and so positioned as to separate said second wavelength range from said first wavelength range by reflecting said second wavelength range to said detecting means, while allowing said first wavelength range to pass through said second dichroic mirror.

6. A data recording system for recording data on a memory element comprising:

light means for generating a light beam comprising a first light source for generating a first wavelength range and a second light source for generating a second wavelength range, said first and second wavelength ranges different from each other, said first wavelength range being capable of changing portions of said data tracks selectively to indicate stored data, while said beam second wavelength range remains relatively unaffected by said data tracks, modulating means for modulating said first wavelength range of said beam in response to data input to said modulating means, as the beam is scanned by scanning means across said data tracks, thereby to form a pattern of changed portions in said data tracks indicative of the data;

said light means and said modulating means positioned to input said beam to said scanning means, for scanning said beam on said data tracks on said memory element;

said beam first wavelength range being selected to interact with said data tracks for the transmission of data relative to said data tracks while said beam second wavelength range remains relatively unaffected by said data tracks;

said memory element comprising a series of said data tracks and a series of beam guide tracks, each beam guide track of said series of beam guide tracks located relative to each one of said data tracks to intercept at least a portion of said beam when said beam is scanning a predetermined path on a given one of said data tracks, said series of beam guide tracks comprising a material relatively absorptive of said beam second wavelength range and relatively transmissive of said beam first wavelength range, and said series of data tracks comprising a material relatively absorptive of said beam first wavelength range and relatively transmissive of said beam second wavelength range, thereby to change a characteristic of said second wavelength range of said beam when it deviates from said predetermined path on said data track, while said beam first wavelength range remains relatively unaffected by said beam guide tracks;

detecting means for detecting said second wavelength range of said beam after said beam has scanned said memory element, said detecting means generating a signal responsive to the extent of said characteristic of said second wavelength range, said signal input to a generating means;

said generating means responsive to said signal from said detecting means, to generate a control signal representative of the extent of change of characteristic of said second wavelength range from a predetermined value, said control signal thus being representative of the extent of deviation of said beam from said predetermined path on said data track, said control signal being input to said scanning means; and said scanning means responsive to said control signal from said generator means, to adjust the position of said beam on said memory element.

7. The data recording system of claim 6 wherein said series of beam guide tracks serves to absorb said beam second wavelength range, said second wavelength range being substantially unabsorbed by the material forming said data tracks, said detecting means functions to detect the intensity characteristic of said beam second wavelength range, and said generating means generates a control signal representative of the change in intensity characteristic of said beam second wavelength range from a predetermined value.

8. The data recording system of claim 6 wherein said light beam is comprised of two separate wavelength ranges with one range being absorbed more by said target tracks and the other range being absorbed more by the material forming said data tracks.

9. The data recording system of claim 6 wherein said first light source and said modulating means are located to pass said first wavelength range through a first dichroic mirror, and said second light source is located to reflect said second wavelength range from said dichroic mirror along the same path as said first wavelength range, said first and second wavelength ranges comprising said light beam.

10. The data writing system of claim 9 wherein a second dichroic mirror is located to intercept said light beam after said beam has scanned said memory element, and so positioned as to separate said second wavelength range from said first wavelength range by reflecting said second wavelength range to said detecting means, while allowing said first wavelength range to pass through said second dichroic mirror.

11. The data recording system of claim 6 including means for detecting said beam first wavelength range for sensing the change effected thereon by the interaction with said memory element, thereby to generate a signal indicative of data stored on said memory element.

References Cited

UNITED STATES PATENTS

| | | | |
|---|---|---|---|
| 3,396,266 | 8/1968 | Max et al. | 350—150 |
| 3,164,816 | 1/1965 | Chang et al. | |
| 3,164,744 | 1/1965 | Bowker. | |
| 3,195,113 | 7/1965 | Giordano. | |
| 3,335,282 | 8/1967 | Masson | 250—202 |

ROBERT SEGAL, Primary Examiner

U.S. Cl. X.R.

250—219, 226; 340—174.1